June 24, 1969 A. B. RENDER 3,451,412
ELECTRICAL CONTROL OF FLUID AMPLIFIERS
Filed Oct. 31, 1966 Sheet 3 of 3

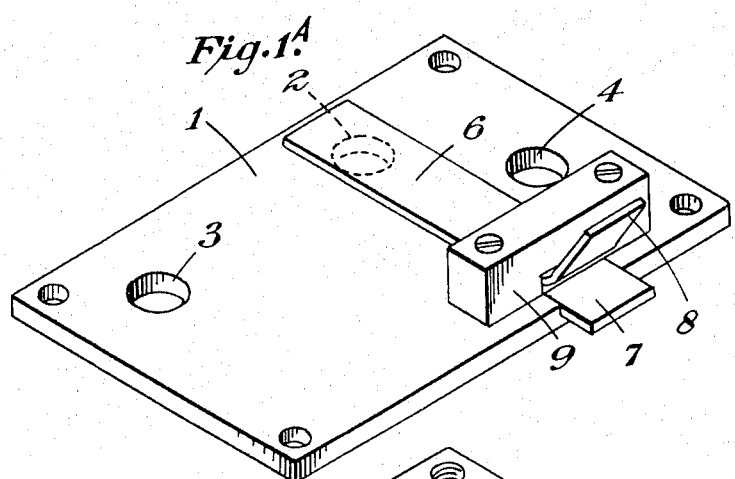
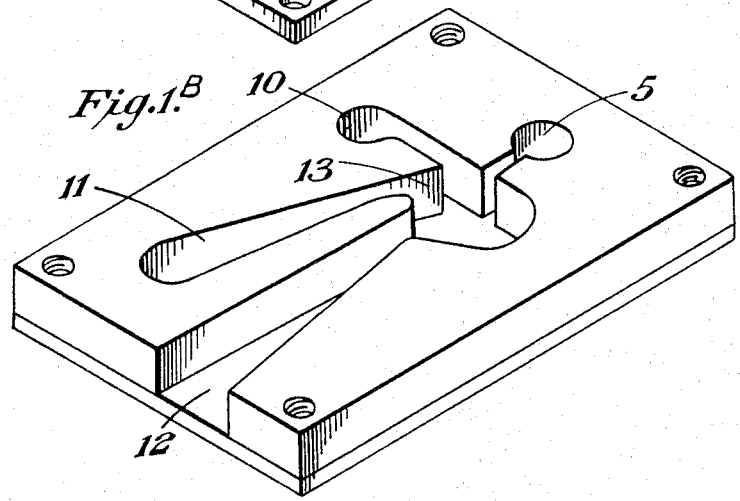
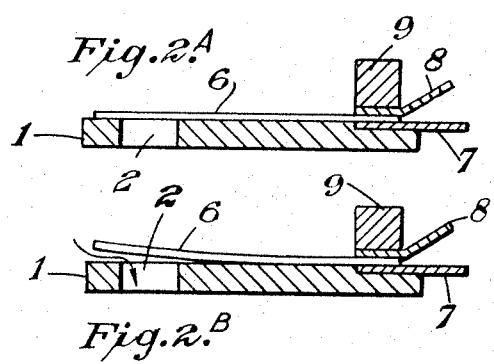

Inventor:
Alwyn Barrie Render
By Baldwin, Wight, Diller & Brown
Attorneys

United States Patent Office 3,451,412
Patented June 24, 1969

3,451,412
ELECTRICAL CONTROL OF FLUID AMPLIFIERS
Alwyn Barrie Render, Ashington, Sussex, England, assignor to The Printing, Packaging & Allied Trades Research Association, Surrey, England, a corporation of the United Kingdom
Filed Oct. 31, 1966, Ser. No. 590,765
Claims priority, application Great Britain, Nov. 10, 1965, 47,689/65
Int. Cl. F15c 1/04, 1/10
U.S. Cl. 137—81.5
13 Claims

ABSTRACT OF THE DISCLOSURE

This invention relates to a fluid flow control valve comprising a body having a passage through which, in use, a fluid can flow, and a piezoelectric element arranged to regulate the flow of fluid through the passage in accordance with electric potentials applied to the element; and to wall-attachment fluid logic elements and fluid analogue amplifiers comprising such a control valve.

---

This invention relates to electrically operated fluid flow control valves; and to fluid logic elements and fluid amplifiers comprising such valves.

It is known to use fluid logic elements in complex control systems operated throughout by fluid means. Electrically operated fluid flow control valves, for example solenoid operated valves, are also known. The present invention provides an improved electrically operated fluid flow control valve which is capable of rapid operation and is particularly suitable for coupling a fluid system with an electrical system; the valve will obviously have other uses.

According to this invention, a fluid flow control valve comprises a body having a passage through which, in use, a fluid can flow and a piezoelectric element arranged to regulate the flow of fluid through the passage in accordance with electric potentials applied to the element.

The piezoelectric element may be so arranged that, as it expands and contracts in response to an applied electric potential, it variably restricts the flow either directly or by means of a mechanism mechanically coupled to it. In a preferred arrangement a bender element is used, the element being a strip which bends in response to the expansion and contraction arising from the piezoelectric effect; such an arrangement can provide mechanical amplification of the piezoelectric movement. The bender element may itself be the movable control element of the valve.

Examples of fluid devices comprising a fluid flow control valve according to this invention will now be described, referring to the accompanying drawings, in which:

FIGURE 1A shows the upper plate of a wall-attachment mono-stable fluid amplifier, provided with a piezoelectric bender element;

FIGURE 1B shows a base assembly, to which the upper plate shown in FIGURE 1A is attached in use;

FIGURE 2A shows the bender element and upper plate of FIGURE 1A in section, with the port closed;

FIGURE 2B is a view similar to that of FIGURE 2A, but with the port open;

Figure 3:
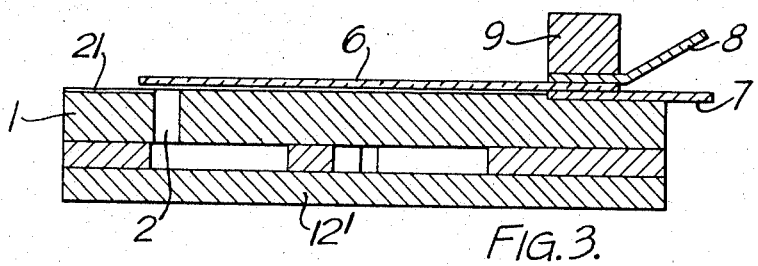
FIGURES 3 and 4 show modifications of the amplifier of FIGURES 1A to 2B.

In the figures, a valve body comprises a plate for attachment to a base assembly shown in FIGURE 1B. Holes 2 and 3 in the plate serve respectively as a control inlet port and as an outlet port of the amplifier; a hole 4 serves as a primary fluid inlet port to admit a supply of air under pressure to a main jet 5, on FIGURE 1B, of the amplifier. A piezoelectric bender element 6, provided with terminal electrodes 7 and 8, is clamped to the plate 1 by means of a clamp 9, as a cantilever. When the electric potential between the electrodes is zero, the element lies flush with the plate, the free end closing the control port as shown in FIGURE 2A. The application of a potential, of suitable polarity, between the electrodes 7 and 8 causes the element to bend, so that the free end lifts away from the plate; air can then flow (as indicated by the arrows in FIGURE 2B) from above the plate into a control jet duct 10 in the base assembly, provided that a suitable pressure difference exists. A high resistance electrical path is provided between the electrodes, to discharge the charge on the element, when the applied potential is removed.

The base assembly has chambers and passages, including the main jet 5 and control duct 10 hereinbefore mentioned, and an output limb passage 11 and a vent passage 12. The output limb communicates with the output port 3, when the plate 1 is attached to the base assembly.

The chambers and passages in the base assembly are arranged, in known manner, so that when air is supplied to the main jet 5 at a suitable pressure, the control inlet port 2 being closed, air flowing from the main jet attaches to an offset wall 13 of the output limb 11 and flows out through the output port 3. The pressure in the control duct 10 is then less than the atmospheric pressure.

When the control port 2, which serves as a secondary fluid inlet port, is opened by the element 6 in response to an electric signal, the upper surface of the plate 1 being exposed to air at atmospheric pressure, air flows in through the control port 2 and duct 10, into the separation region of the main jet flow, causing the main jet flow to detach from the wall 13 and pass into the vent 12; there is then no flow at the output port 3.

The device as just described can be applied to many kinds of wall-attachment device, a separate bender element assembly being provided to regulate the flow into each control port of the fluid element. However, each of the three optional modifications, now to be described, gives some improvement in performance.

The bender element is normally adjusted so as to allow a small clearance between the tip of the element and the top plate. Under certain conditions the tip can come into contact with the top plate and the air forces acting on it may be sufficient to prevent the element bending in the normal manner. This siuation can be avoided by providing a shallow groove 21 in the top plate 1, as shown in FIGURE 3. This allows some air leakage into the control port 2. The size of the groove must be such that the leakage flow in insufficient to switch the bender element 6, but sufficient to reduce appreciably the net effective air force acting on the bender element tending to hold the element in the position closing the control inlet port 2.

Figure 4:
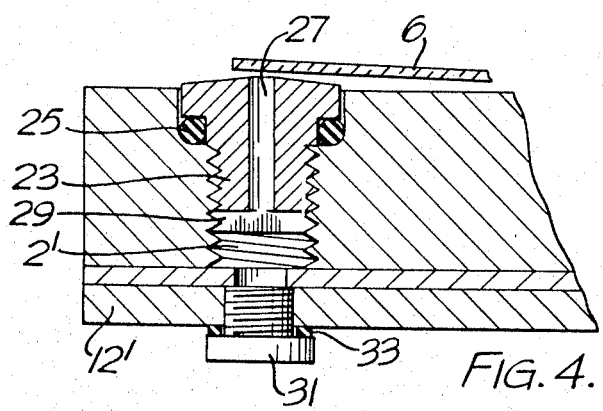

Some difficulty may arise in assembling the units in obtaining the required position of the tip with respect to the inlet port. This can be accomplished by shimming at the clamp 9, but the process is greatly simplified by the arrangement shown in FIGURE 4. Here the control inlet 2' in the top plate is enlarged, tapped and counterbored. An adjustable inlet port member 23 is threaded to suit the top plate and is provided with a head to fit inside the counterbore. An O-ring seal 25 beneath the head prevents air leakage and forms a friction lock to prevent movement of the port member 23 after adjustment. A hole 27 is drilled through the centre of the port member 23 to act as the control flow inlet and a screwdriver slot 29 is cut into the bottom to facilitate adjustment. The upper face of the port member is conical to ensure that the bender element 6 is not prevented by the edges of the face from sealing the inlet. Access to the slot 29 in the port member is provided by a tapped hole in the base plate 12' of the fluid element. When the inlet has been adjusted to the required setting the access hole is sealed by means of a screw plug 31 and seal 33.

Figure 5A:
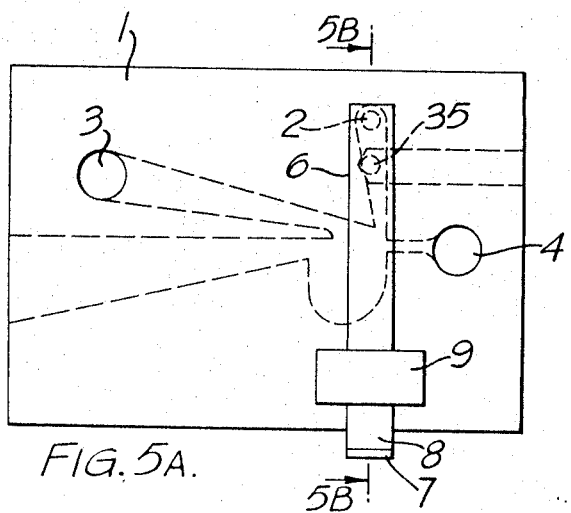
FIGURES 5A and 5B show a further modification of the amplifier of FIGURES 1A to 2B.

Although the useful frequency range of the device can be considerably extended, by the use of a leakage groove such as 21 in FIGURE 3, the force available to raise the tip of the bender element is limited and movements become very small at high frequencies and eventually insufficient clearance is obtained to permit of flow sufficient to switch the element. A further extension in the frequency range can be had by using the arrangement shown in FIGURES 5A and 5B. A small air jet 35 is provided in the top plate 1, beneath the bender element 6 and adjacent the control port inlet 2 and assists the operation in two ways. The force exerted by this jet helps the piezoelectric force to obtain higher tip deflections while the increased air pressure, in the region of the inlet, increases the flow into the control port for any given deflection. The combination of these two effects results in the required clearance being obtained at considerably higher frequencies than can be attained with the unassisted arrangement.

The device described and illustrated would serve as a NOT element. With no electrical signal present the control inlet port 2 is closed and the main jet flow is directed through the output port 3; when a sufficient electric control signal is present, the control inlet port 2 is open and the main jet flow passes through the vent 12.

It will be evident that many other forms of fluid logic element may be controlled, in a similar manner, by means of the device of this invention. Furthermore, since the deflection of the piezoelectric bender element is related to the applied potential, the device of this invention can also be used to control an analogue amplifier.

Figures 5B, 6B:
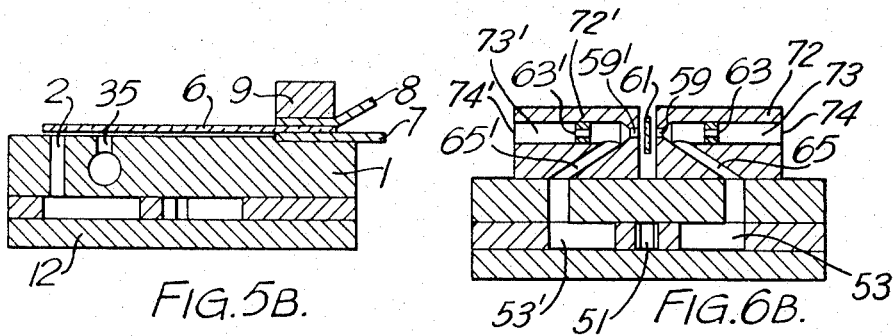
FIGURES 6A, 6B and 6C illustrate a jet-interaction analogue fluid amplifier.
Figure 6A:
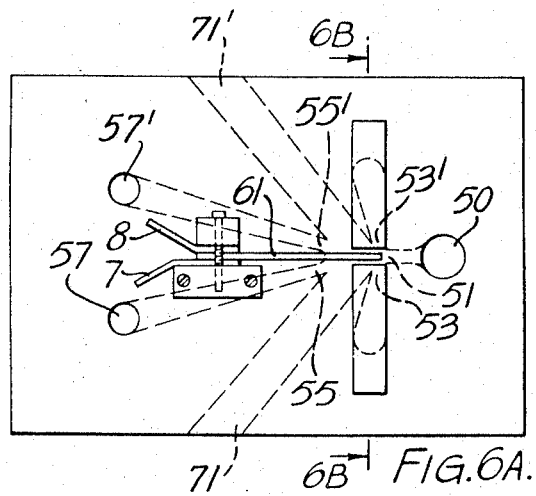
Figure 6C:
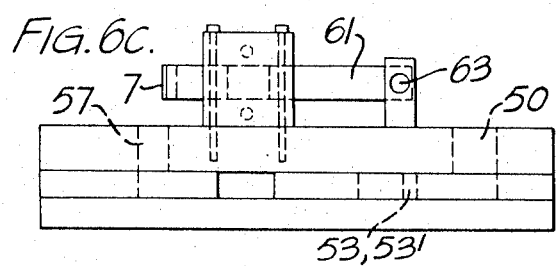

An exemplary analogue arrangement, for use with a jet-interaction amplifier, is shown in FIGURES 6A, 6B and 6C.

This arrangement constructionally comprises a body 69 having disposed therein a primary fluid inlet port 50 communicating with a main jet 51 located between a pair of control jets 53, 53', the control jets each lying substantially perpendicular to the main jet axis. A pair of first passages 71, 71' are disposed within the body 69, the first passages being radial to the main jet 51 and venting to the exterior of the body. A pair of second passages 55, 55' are also disposed within the body 69, each second passage having an inlet substantially opposite the main jet 51, each second passage 55, 55' communicating with a corresponding fluid outlet port 57, 57' respectively.

Mounted above the body 69 are a pair of branched T pipe assemblies 72, 72', each respectively having a straight through limp 73, 73' and a branch limb 65, 65'. Each straight through limb 73, 73' respectively contains a restriction 63, 63' and has respectively a secondary fluid inlet port 74, 74' at one end and a restricted end 59, 59' at its other end. Each restriction 63, 63' is located between its corresponding inlet port 74, 74' and branched limb 65, 65'. Also mounted above the body is a piezoelectric bender element 61 having one movable end, the other end being fixed and clamped between terminals 7, 8. Electrical signals are supplied to terminals 7, 8 for causing the movable end of the bender element 61 to flex, such that one side of said movable end will close towards one restricted end, e.g. 59 of the branched T pipe assembly 73, whilst the other side of the movable end simultaneously opens away from the other restricted end 59'. Said sides of the movable end of the bender element 61 thereby form valve closure members for each of the restricted ends 59, 59'.

The function of the above arrangement will now be decribed with reference to fluid flow therethrough. Primary fluid is supplied to the primary fluid inlet port 50 and passes through the main jet 51 normally to impinge on the inlets of the second passages 55, 55'. Provided that the primary fluid flow issues from the main jet 51 without deflection (as hereinafter described), and the geometry of the arrangement is symmetrical, said primary flow divides equally between the inlets of the second passages 55, 55', flows through each of said second passages and emerges from each fluid outlet port 57, 57'.

Secondary fluid is supplied to each secondary fluid inlet 74, 74' and passes respectively through each restriction 63, 63' to emerge from the restricted ends 59, 59' of each straight through limb of said branched T pipe assemblies 72, 72', and from the branch limbs 65, 65' thereof. When the movable end of the bender element 61 lies midway between the restricted ends 59, 59', the secondary fluid flow pressure at the two control jets will be equal and opposite and the primary fluid flow issuing from the main jet 51 will be undeflected. However, when an electrical signal is supplied to terminals 7, 8 to cause the bender element 61 to flex, the movable end thereof deflects towards one or other of the restricted ends 59, 59'. Since each side of said movable end can act as a valve closure member, the side moving towards one restricted end, e.g. restricted end 59, causes the secondary fluid pressure to rise at the branch limb 65 and to fall at the branched limb 65'. That is, more secondary fluid escapes from the restricted end 59' than from 59. Accordingly, a secondary fluid pressure difference is set up between the control jets 53, 53' and the primary fluid flow from the main jet 51 is deflected towards the second passage 55'. Thus, a fluid pressure or flow difference appears between the fluid outlet ports 57, 57' dependent on the electrical signal supplied to terminals 7, 8 said signal being, for example, a resultant electrical differential input signal to terminals 7, 8.

Further increases in the potential of the electrical signal supplied to the bender element 61 will result in the primary fluid flow from the main jet 51 being deflected into the first passage 71'. Reversing the potential of the electrical signal supplied to terminals 7, 8 will cause a reverse action of the foregoing function. Thus, a pressure or flow output proportional to the voltage input can be obtained.

Although in the examples described, air at substantially atmospheric pressure is controlled by the piezoelectric element, the invention also envisages the control of suitable fluids at other pressures. The piezoelectric element can be arranged to have very rapid response, while the element will place only a very small load on an associated electrical system. Since the only moving part is the bender element, the long service life and high reliability associated with fluid systems will be preserved.

The piezoelectric element may, for example, comprise lead zirconate titanate; other known piezoelectric materials may however be used, if desired.

What is claimed is:

1. A fluid flow control valve comprising a body with a passage therein, a control port on one face of the body and communicating with the said passage in the body through which, in use, a fluid can flow, a piezoelectric bender strip element capable of bending in response to expansion and contraction arising from the piezoelectric effect and being operable for directly regulating flow of fluid into said control port, means for connecting the piezoelectric element to a source of electrical signals, means securing the piezoelectric bender strip element to the body in such a way as to permit the piezoelectric bender strip element to regulate the flow of fluid from without the body into the control port, in accordance with the said electrical signals, and an auxiliary jet directed toward said bender strip element and located adjacent said control port, said auxiliary jet being operable to bias said bender strip element to open said control port and to increase the pressure at said control port.

2. A fluid flow control valve comprising a body having disposed therein a main jet, a primary fluid inlet port communicating with said main jet for supplying a primary fluid flow thereto, a first passage for receiving said primary fluid flow and for venting said flow to the exterior of said body, a second passage inclined at an angle to said first passage and for receiving said primary flow, a fluid outlet port on the exterior of said body communicating with said second passage, a control jet adjacent said main jet, a secondary fluid inlet port for supplying a secondary fluid flow to said control jet, said primary fluid flow normally passing through said second passage by wall attachment therewith, said control jet being supplied with said secondary fluid flow when required for deflecting said primary fluid flow from said second to said first passage, a single piezoelectric bender element having only one movable end, its other end being fixed, said bender element being adapted for connection to a source of electrical signals and being flexed in response to said electrical signals, a part of said movable end acting as a regulating member moving in response to said electrical signals which are capable of causing said bender element to flex, and regulating the flow of secondary fluid to, and hence through, the control jet for controlling said primary fluid flow through said first and said second passages.

3. The wave as set forth in claim 2 wherein said fixed end of said piezoelectric bender element is located between electrical terminal means, said movable end of said bender element being movable away from said secondary fluid inlet port when said bender element is caused to flex in response to said electrical signals when applied across said terminal means.

4. The valve as set forth in claim 2 in which said first passage for receiving and venting said primary fluid flow is a single passage aligned with said main jet, said second passage is also a single passage, and said control jet is a single jet substantially perpendicular to said main jet.

5. The valve as set forth in claim 2 wherein a predetermined leakage is provided in said secondary fluid inlet port allowing said secondary fluid flow therethrough when said closure member is seated on said fluid inlet port, said predetermined leakage substantially reducing the net effective force exerted by the external fluid pressure on said valve closure member tending to hold said valve closure member in position closing said secondary fluid inlet port when said bender element movable end contacts the exterior of said body.

6. The valve as set forth in claim 2 including an auxiliary jet directed toward a part of said movable end of said piezoelectric bender element adjacent said valve closure member, said auxiliary jet being adapted to supply a fluid flow for biasing said valve closure member away from said secondary flow inlet port.

7. The valve as set forth in claim 2 including means for presetting the position of said secondary fluid inlet port relative said valve closure member.

8. The valve as set forth in claim 7 wherein said presetting means comprises a plug threadably located in said secondary fluid inlet port, said plug having a bore therein allowing said secondary fluid flow therethrough to said control jet, said valve closure member seating on the inlet to said bore.

9. The valve as set forth in claim 8 in which said fluid outlet port is connectable to a fluidic logical circuit, said valve operating as a NOT element in said circuit, said primary fluid flow being directed through said second passage to said fluid outlet port when no electrical signal is supplied to said piezoelectric bender element, and said piezoelectric bender element being operable upon supplying of an electrical signal thereto for regulating said secondary fluid flow to cause said primary fluid flow to be directed through said first passage and vented to the exterior of said body.

10. A fluid flow control valve comprising a body having disposed therein a main jet, a primary fluid inlet port communicating with said main jet for supplying a primary fluid flow thereto, two first passages radial to said main jet each for independently receiving and for venting said primary fluid flow to the exterior of said body, two second passages having inlets substantially opposite said main jet each for receiving part of said primary fluid flow, each of said second passages communicating with corresponding fluid outlet ports on the exterior of said body, two control jets each located on opposite sides of an substantially perpendicular to said main jet, each of said control jets communicating with a corresponding inlet port on the exterior of said body, each of said inlet ports communicating with a branch limb of a corresponding branched T pipe assembly secured to said body, the straight-through limb of each of said assemblies having one restricted end venting to the exterior of said body and its other end connected to a secondary fluid supply, said restricted ends being located substantially opposite one another, a single piezoelectric bender element having only one movable end, its other end being secured to said body, said bender element being adapted for connection to a source of electrical signals, said moveable end being arranged between said oppositely facing restricted ends of said pipe assemblies such that a part of each side of said movable end acts as a valve closure member for corresponding restricted ends of said pipe assemblies whereby one of said valve closure members is capable of closing toward one of said restricted ends while simultaneously opening away from the other of said restricted ends, said latter action of said closure members causing said primary fluid flow to be divided between the inlets of said second passages by a ratio dependent on the value of said electrical signals supplied to said bender element for flexing, said movable end thereof moving toward one or other of said restricted ends thereby regulating said secondary fluid flow to each of said control jets for said primary fluid flow division or for deflecting said primary fluid flow to one or other of said first passages.

11. The valve as set forth in claim 10 wherein said fixed end of said piezoelectric bender element is located between terminal means, said movable end of said bender element moving toward one of said restricted ends and away from the other of said restricted ends when said bender element is caused to flex in response to said electrical signals applied across said terminal means, said electrical signals being capable of controlling said ratio between said divided primary fluid flow for providing a pressure or a flow differential between said fluid outlet ports of said second passages.

12. The valve as set forth in claim 11 wherein a restriction is located within each of said straight-through limbs of said branched T pipe assemblies before the inlets to each of said branch limbs thereof.

13. The valve as set forth in claim 12 in which said fluid outlet ports of said second passages are connectable in a fluidic logical circuit, said valve operating as a control element of a fluidic analogue jet interaction amplifier in said circuit for deriving said pressure or flow differential output at said fluid outlet ports in response to said electrical input signals to said terminal means.

References Cited

UNITED STATES PATENTS

| | | | |
|---|---|---|---|
| 3,182,686 | 5/1965 | Zilberfarb | 137—81.5 XR |
| 3,266,511 | 8/1966 | Turick | 137—81.5 |
| 3,266,513 | 8/1966 | Voit | 137—81.5 |
| 3,269,419 | 8/1966 | Dexter | 137—81.5 |
| 3,279,531 | 10/1966 | Bowles. | |
| 3,376,881 | 4/1968 | Godwin | 137—81.5 |
| 3,390,692 | 7/1968 | Hastie et al. | 137—81.5 |

SAMUEL SCOTT, *Primary Examiner.*